United States Patent Office 3,591,381
Patented July 6, 1971

---

3,591,381
STABILIZED DIAZOTYPE COMPOSITION
William C. Gray and Frederick A. Stahly, Rochester, N.Y., assignors to Eastman Kodak Company, Rochester, N.Y.
No Drawing. Filed July 31, 1967, Ser. No. 663,470
Int. Cl. G03c 1/60
U.S. Cl. 96—75    5 Claims

ABSTRACT OF THE DISCLOSURE

The fading of azo dyes is inhibited by the presence of certain hindered phenols which are substituted in the 2-position and in the 4-position. These hindered phenols are particularly useful in diazotype reproduction media, especially the "two component" media containing a diazonium salt, a blue coupler and a yellow coupler in proportions sufficient to yield a neutral image after exposure and development.

---

This invention relates to photography and in particular to the stabilization of photographic azo dyes.

Azo dyes are widely used in photographic systems, for example, in dye-bleach and diazo processes. However, due to their susceptibility to oxidation, many azo dyes undergo disadvantageous fading.

Accordingly, it is an object of this invention to provide new stabilizers for azo dyes.

It is also an object of this invention to provide novel stabilized azo dyes.

Another object of the present invention is to provide new diazotype compositions which, when developed, incorporate stabilized azo dyes.

These and additional objects of the present invention will become apparent from a consideration of the following specification and appended claims.

The objects of this invention are accomplished with compositions comprising an azo dye in admixture with a hindered phenol in an amount sufficient to inhibit fading of the azo dye.

Hindered phenols which are employed in the practice of this invention include those hindered phenols containing, in the 2-position, either an alkyl or a cycloalkyl radical and, in the 4-position, either an alkyl radical, an alkoxy radical, a hydroxyl radical or a thioether radical which with the hindered phenolic moiety completes a hindered bis-thiophenol, and more generally a symmetrical bis-thiophenol.

Typical useful hindered phenols employed herein include those having the formulas:

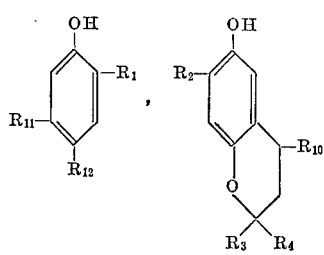

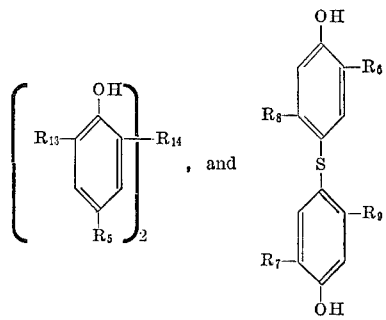

wherein each of $R_1$ through $R_9$ is an alkyl radical; each of $R_{10}$ and $R_{11}$ is either a hydrogen atom or an alkyl radical; $R_{12}$ is either a hydroxyl radical, an alkyl radical or an alkoxy radical; $R_{13}$ is either an alkyl radical or a cycloalkyl radical; and $R_{14}$ is a lower alkylene radical.

As comprehended herein, an alkyl radical is a straight or branched chain alkyl radical having from 1 to about 18 carbon atoms. Typical such alkyl radicals are, for example, methyl, ethyl, isopropyl, tert-butyl, tert-octyl, dodecyl, tetradecyl and the like. Cycloalkyl radicals as described herein are saturated monovalent carbocyclic radicals having 4 to 6 nuclear carbon atoms, such as a cyclobutyl, cyclopentyl, cyclohexyl, 1-methylcyclohexyl and the like radicals. Alkoxy radicals, as defined herein, are straight or branched chain alkoxy radicals having from 1 to about 18 carbon atoms. Illustrative alkoxy radicals are methoxy, carboxymethoxy, ethoxy, butoxy, octoxy, dodecoxy, tridecoxy, α-ethoxycarbonyltridecoxy and the like. Lower alkyl and alkoxy radicals herein are typically straight or branched chain alkyl or alkoxy radicals having from 1 to 8 carbon atoms with, from 1 to 4 carbon atoms being preferred. Typical such radicals are, for example, methyl, methoxy, ethyl, ethoxy, propyl, isopropyl, propoxy, tert-butyl, butoxy, octyl, octoxy, etc. Lower alkylene radicals as noted herein are alkylene radicals having from 1 to 4 carbon atoms, such as methylene, ethylene, propylene and butylene.

Particularly useful hindered phenols employed in the subject invention include compounds of the formula:

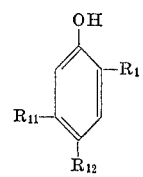

wherein $R_1$ is an alkyl radical and preferably a tertiary alkyl radical having 4 to 8 carbon atoms; $R_{12}$ is either a hydroxyl radical, an alkyl radical or an alkoxy radical; and $R_{11}$ is (1) a hydrogen atom when $R_{12}$ is an alkyl radical, (2) an alkyl radical when $R_{12}$ is a hydroxyl radical, and (3) either a hydrogen atom or an alkyl radical when $R_{12}$ is an alkoxy radical;

Compounds of the formula:

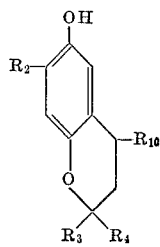

wherein each of $R_2$ to $R_4$ is an alkyl with $R_3$ and $R_4$ preferably being methyl radicals and $R_{10}$ is either a hydrogen atom or an alkyl radical;

Compounds of the formula:

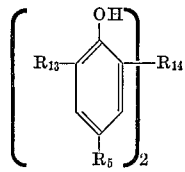

wherein $R_5$ is an alkyl radical, $R_{13}$ is either an alkyl radical or a cycloalkyl radical and $R_{14}$ is a lower alkylene radical, preferably a methylene or an ethylene radical; and compounds of the formula:

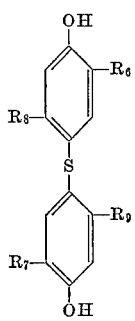

wherein each of $R_6$ to $R_9$ is an alkyl radical and $R_6$ and $R_7$ are preferably tertiary alkyl radicals having from 4 to 8 carbon atoms.

Typical specific hindered phenols useful in the invention include, for example, such compounds as:

(a) 2-tert-butyl-4-(α-ethoxycarbonyltridecyloxy)phenol,
(b) 2-tert-butyl-4-dodecoxyphenol,
(c) 2-tert-butyl-4-methoxy phenol,
(d) 2-tert-butyl-4-(carboxymethoxy)phenol,
(e) 2-tert-octyl-4-methoxy phenol,
(f) 2,5-di-tert-butyl-4-methoxy phenol,
(g) 2-tert-butyl-4-methyl phenol,
(h) 2-tert-octyl-4-methyl phenol,
(i) 2,5-di-tert-butylhydroquinone,
(j) 2,5-di-tert-octyl hydroquinone,
(k) 2,2-dimethyl-4-isopropyl-7-tert-butyl-6-chromanol,
(l) 2,2-dimethyl-4-isopropyl-7-tert-octyl-6-chromanol,
(m) 2,2-dimethyl-4-isopropyl-7-tetradecyl-6-chromanol,
(n) 2,2,4-trimethyl-7-isopropyl-6-chromanol,
(o) 2,2-dimethyl-7-tert-butyl-6-chromanol,
(p) 2,2′-methylenebis[6-(1-methylcyclohexyl)-4-methylphenol],
(q) 2,2′-methylenebis(6-tert-butyl-4-methylphenol),
(r) 2,2′-methylenebis(6-tert-butyl-4-ethylphenol),
(s) 2,2′-methylenebis(4,6-di-tert-butylphenol), and
(t) 4,4′-thiobis(2-tert-butyl-5-methylphenol).

The hindered phenols useful herein can be employed in conjunction with any azo-dyes, that is to say, any dye containing an azo linkage (—N=N—), such as those produced in photographic systems by the reaction of a benzene diazonium salt with couplers such as compounds containing an active hydrogen bonded to carbon, e.g., phenols, aromatic amines, compounds having an enolizable ketone group on an aliphatic chain, heterocyclic compounds containing pyrrole, indole, and similar ring systems and the like compounds. The phenolic stabilizers of this invention are preferably employed with dyes derived from benzene diazonium salts and phenolic couplers.

Typical benzene diazonium salts include those of the formula:

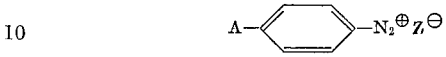

wherein A is either a hydrogen atom, a halogen atom, an aryl radical, an amino radical (including substituted amino radicals), or a substituted mercapto radical, and Z is an anion. These compounds can also be substituted on one or more of the nuclear carbons with at least one of either a halogen atom, an alkyl radical, an alkoxy radical, an acyl radical, a carbamyl radical, a carboxyl radical or a nitro radical.

Particularly useful compounds within the scope of this invention include benzene diazonium salts having the formula as described above wherein A is either an amino radical including substituted amino radicals or a substituted mercapto radical, and wherein the benzene nucleus is unsubstituted or substituted in at least one of the 2-position and the 5-position with either an alkyl radical or an alkoxy radical. This class of useful diazonium salts can be represented by the formula:

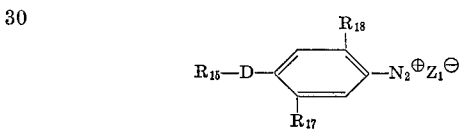

wherein:
(1) D is either a sulfur atom or a radical having the formula $NR_{16}$,
(2) $R_{15}$, when taken alone, is either a hydrogen atom when D is $NR_{16}$, or a lower alkyl radical, a lower alkoxy radical, a lower acyl radical, an aryl radical having a nucleus of 6 carbon atoms, or an aralkyl radical when D is either a sulfur atom or $NR_{16}$,
(3) $R_{16}$, when taken alone, is either a hydrogen atom, a lower alkyl radical or a lower alkoxy radical,
(4) $R_{15}$ and $R_{16}$, when taken together, complete a divalent radical having the formula

wherein $b$ is an integer having a value of 0 or 1, each of $a$ and $c$ is a positive integer, and the sum of $a$, $b$ and $c$ has a value of 5,
(5) $R_{17}$ and $R_{18}$ are each either a hydrogen atom, a lower alkyl radical (preferably methyl or ethyl) or a lower alkoxy radical (preferably methoxy or ethoxy), and
(6) $Z_1$ is an anion.

Preferred benzene diazonium salts include the substituted amino benzene diazonium salts having the formula:

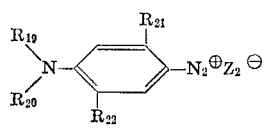

wherein:
(1) each of $R_{19}$ and $R_{20}$, when taken alone, is a lower alkyl radical,
(2) $R_{19}$ and $R_{20}$, when taken together are the number of carbon and hetero oxygen atoms necessary to complete a morpholino radical,
(3) each of $R_{21}$ and $R_{22}$ is either a hydrogen atom, a lower alkyl radical or a lower alkoxy radical, and
(4) $Z_2$ is either a chlorozincate anion, a fluoroborate anion or a chlorostannate anion.

The most preferred benzene diazonium salts are the fluoroborate salts wherein (a) $R_{21}$ and $R_{22}$ are alkoxy radicals when $R_{19}$ and $R_{20}$ complete a morpholino radical, and (b) $R_{21}$ and $R_{22}$ are each a hydrogen atom when $R_{19}$ and $R_{20}$ are each a lower alkyl radical.

Illustrative of the subject diazonium salts are such compounds as the salts of 1-diazo-2,5-dimethoxybenzene,
1-diazo-2,5-diethoxybenzene,
1-diazo-4-chloro-2,5-diethoxybenzene,
4-diazo-2,5-dimethoxybiphenyl,
4-diazo-2,5,4′-triethoxybiphenyl,
1-diazo-4-dimethylaminobenzene,
1-diazo-4-(diethoxyamino)benzene,
1-diazo-4-[bis(hydroxypropyl)amino]benzene,
1-diazo-4-(N-methyl-N-allylamino)benzene,
1-diazo-4-(diamylamino)benzene,
1-diazo-4-(oxazolidino)benzene,
1-diazo-4-(cyclohexylamino)benzene,
1-diazo-4-(9-carbazolyl)benzene,
1-diazo-4-(dihydroxyethylamino)-3-methylbenzene,
1-diazo-4-dimethylamino-3-methylbenzene,
1-diazo-2-methyl-4-(N-methyl-N-hydroxypropylamino) benzene,
1-diazo-4-dimethylamino-3-ethoxybenzene,
1-diazo-4-diethylamino-3-chlorobenzene,
1-diazo-2-carboxy-4-dimethylaminobenzene,
1-diazo-3-(2-hydroxyethoxy)-4-pyrrolidinobenzene,
1-diazo-2,5-diethoxy-4-acetoxyaminobenzene,
1-diazo-4-methylamino-3-ethoxy-6-chlorobenzene,
1-diazo-2,5-dichloro-4-benzylaminobenzene,
1-diazo-4-phenylaminobenzene,
1-diazo-4-morpholinobenzene,
1-diazo-4-morpholino-3-methoxybenzene,
1-diazo-4-morpholino-2,5-dimethoxybenzene,
1-diazo-4-morpholino-2-ethoxy-5-methoxybenzene,
1-diazo-4-morpholino-2,5-dibutoxybenzene,
1-diazo-2,5-diethoxy-4-benzoylaminobenzene,
1-diazo-2,5-dibutoxy-4-benzoylaminobenzene,
1-diazo-4-ethylmercapto-2,5-diethoxybenzene,
1-diazo-4-tolymercapto-2,5-diethoxybenzene, and the like.

The couplers which can be reacted with the benzene diazonium salt to form the dye which is stabilized against fade in accordance with this invention include those disclosed by Kosar, "Light-Sensitive systems," John Wiley & Sons, Inc., New York (1965), pp. 220–240. Phenolic couplers are preferred, however, with particularly preferred classes including:

(A) as blue couplers, 2-hydroxy-3-naphthoanilides having the formula:

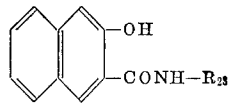

wherein $R_{23}$ is a phenyl radical, and preferably a phenyl radical substituted with at least one of either a lower alkyl radical or a lower alkoxy radical or a halogen atom;

(B) as yellow couplers, 1-hydroxy-2-naphthamides having the formula:

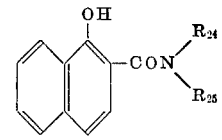

wherein (1) each of $R_{24}$ and $R_{25}$, when taken alone, is either a hydrogen atom or an alkyl radical, a cycloalkyl radical, an aryl radical, an aralkyl radical and the like hydrocarbon or substituted hydrocarbon radicals, (2) $R_{24}$ and $R_{25}$, when taken together represent the carbon and oxygen atoms necessary to complete a six membered heretofore piperidino or morpholino radical, and (C) as yellow couplers, 2-acylamido-5-substituted phenols having the formula:

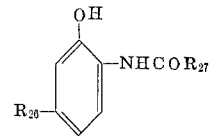

wherein $R_{26}$ is either an alkyl radical or an alkoxy radical and $R_{27}$ is either an alkyl radical, an aryl radical, an aralkyl radical or an aralkoxy radical.

Illustrative of the subject couplers are such compounds as for example, 2-hydroxy-3-naphthanilide,
2-hydroxy-2′-methyl-3-naphthanilide,
2-hydroxy-4′,2′-dimethoxy-5′-chloro-3-naphthanilide,
2-hydroxy-2′,4′-dimethoxy-3-naphthanilide,
2-hydroxy-2′,5′-dimethoxy-4′-chloro-3-naphthanilide,
2-hydroxy-1′-naphthyl-3-naphthanilide,
2-hydroxy-2′-naphthyl-3-naphthanilide,
2-hydroxy-4′-chloro-3-naphthanilide,
2-hydroxy-3-naphthanilide,
2-hydroxy-2′,5′-dimethoxy-3-naphthanilide,
2-hydroxy-2′,4′-dimethyl-3-naphthanilide,
1-hydroxy-2-naphthamide,
N-methyl-1-hydroxy-2-naphthamide,
N-butyl-1-hydroxy-2-naphthamide,
N-octadecyl-1-hydroxy-2-naphthamide,
N-phenyl-1-hydroxy-2-naphthamide,
N-methyl-N-phenyl-1-hydroxy-2-naphthamide,
M-(2-tetradecyloxyphenyl)-1-hydroxy-2-naphthamide,
N-[4-(2,4-di-tert-amylphenoxy)butyl]-1-hydroxy-2-naphthamide,
1-hydroxy-2-naphthopiperidide,
N-(3,5-dicarboxyphenyl)-N-ethyl-1-hydroxy-2-naphthamide,
N,N-dibenzyl-1-hydroxy-2-naphthamide,
N-(2-chlorophenyl)-1-hydroxy-2-naphthamide,
N-(4-methoxyphenyl)-1-hydroxy-2-naphthamide,
1-hydroxy-2-naphthopiperizide,
1,3-bis(1-hydroxy-2-naphthamidobenzene),
2-acetamido-5-methylphenol,
2-acetamido-5-pentadecylphenyl,
2-butyramido-5-methylphenol,
2-(2,4-di-tert-amylphenoxyacetamido)-5-methylphenol,
2-benzamido-5-methylphenol, and the like.

Although the hindered phenols can be employed with azo dyes for any use, they are of particular utility as additives to diazotype reproduction media, especially to so-called "two-component" media which, prior to exposure and development, comprise a polymeric matrix containing at least one benzene diazonium salt and at least one coupler, because of the desirability of providing a stable image in such media. Systems of this type which are particularly sensitive to dye fade are those recently developed systems containing at least one benzene diazonium salt, at least one blue dye-forming coupler, and at least one yellow dye-forming coupler, in proportions such that on exposure and development there is obtained a neutral, i.e., black and white, dye image. Truly neutral images are very difficult to obtain because of the necessity of matching diazonium salts and couplers as to reaction rate, color balance and rate of dye fade. The use of hindered phenols in accordance with this invention facilities development of systems of this type by eliminating dye fade as one variable which must be considered.

The fade-inhibiting amount of phenol is subject to wide variation, but ordinarily will be in the range of from about 0.1 to about 4 moles of phenolic stabilizer per mole of azo dye. Molor ratios of less than about 0.1:1 are generally insufficient to provide a desired degree of stabilization for most purposes, and little or no further improvement in dye stability is ordinarily obtained when molar ratios of greater than 4:1 are employed. Preferred ratios are in the range of from about 0.5:1 to about 3:1 and most preferably from about 0.8:1 to about 2.5:1. The hindered phenol can be admixed with the dye to be stabilized or, as in the case of diazotype reproduction media, can be admixed with the benzene diazonium salt and coupler prior to a dye-forming reaction. In the latter instance, the above-mentioned ratios are based upon the amount of dye theoretically formed on development. However, because couplers are normally employed in molar excess over the benzene diazonium salt to ensure complete conversion of the salt to the dye, the ratios may be conveniently based upon the salt itself.

Typical matrix polymers are polymers which exhibit suitable permeability to the alkaline processing media, especially ammonia, used in diazotype reproduction and include, for example, such polymers as cellulose esters like cellulose acetate, cellulose butyrate and cellulose acetate butyrate, and also vinyl polymers like poly(vinyl acetate), poly(vinylidene chloride) and poly(vinyl butyral). Another typical polymer is poly 4,4'-isopropylidene-diphenyl-2-hydroxy-1,3-propylene ether. Similarly, in the polymeric matrix, the concentration of the dye-forming components, i.e., the benzene diazonium salt and coupler, is widely variable although concentrations of about 20 to about 40 parts by weight per 100 parts of matrix polymer are normally employed, with concentrations in the range from about 25 to about 35 parts per 100 parts being preferred.

In addition to the dye-forming components and dye stabilizers, the polymeric matrix can also contain other additives to modify the properties of the film, such as ultra-violet absorbers, acid stabilizers and the like. A preferred class of additives comprises the known acid stabilizers which prevent premature coupling of the azo salt and the coupler. These acid stabilizers include organic acids such as 5-sulfosalicylic acid and the like. The organic acids are employed in an amount normally varying from about 1 to about 6, and preferably from about 2 to about 5, parts by weight per 100 parts of polymeric matrix. Other typical additives are metal salts, such as zinc chloride, which are used as dye brighteners or development accelerators. The metal salts are normally present in an amount varying from about 0.5 to about 2 parts, and preferably from about 1 to about 1.5 parts, by weight per 100 parts of matrix polymer.

Dye-forming components, dye stabilizers, dye brighteners and other additives, when employed, are dispersed in the matrix polymer by any convenient technique, preferably by admixing all components in a common solvent. A particularly preferred solvent system comprises a mixture of a halogenated aliphatic hydrocarbon, especially ethylene chloride, and an alkanol, especially ethanol. The order of addition of the ingredients can be varied, although it is preferred that acid stabilizers be added to the solution prior to the diazonium salts. Similarly, the amount of solvent is variable, although it is preferred that the resulting solution contain from about 5 to about 15 weight percent solids, and preferably from about 8 to about 12 percent solids.

The resulting solution is then coated in accordance with generally known techniques. Although not essential, it is preferred that the film be cast on a suitable transparent or opaque support material such as cellulose acetate, polyethylene terephthalate, polystyrene, or paper, preferably coated with one of the above materials or suitably subbed with, for example, barium sulfate and the like. The solution is applied to the support at a rate sufficient to provide an optical density when developed, of between .8 and 3, with densities typically ranging from 1 to 2. The resulting product can be exposed and developed in any conventional manner, typically in alkaline media such as an ammonia atmosphere, to produce a stabilized azo dye image.

The following examples illustrate preferred embodiments of the subject invention. In the examples, all parts are by weight.

EXAMPLE I

A diazotype emulsion is prepared by adding 65.0 parts of cellulose acetate to a solution of 568.4 parts of 1,2-dichloroethane and 189.5 parts of ethanol, followed by 2.2 parts of 5-sulfosalicylic acid. To the resulting solution there is added 6.8 parts of 4-(diethylamino)benzene diazonium chlorozincate, 3.8 parts of 3-hydroxy-N-(2,4-dimethoxy-5-chlorophenyl)-2-naphthamide, 2.9 parts of 1-hydroxy-2-naphthoyl piperidide and 2.5 parts of 1-hexadecyl - 2 - (2,6-diethylphenylamino)-4-(2-methoxy-benzylidene)-5-thiazolidone to provide a solution containing 10 percent solids and having a density of 1.15. After filtering, the solution is coated on subbed 4 mil poly(ethylene terephthalate) support at a rate sufficient to provide a density of about 1.6. The resulting photographic element is cured at 75° C. for two minutes. After development by processing with aqueous ammonia vapors, the developed element bearing an azo dye image receives from a xenon arc light (approximating daylight radiation), a uniform surface illumination of 5000 foot-candles for 24 hours. The optical density of the exposed dye image is measured at the maximum absorption spectrum for each of the blue and yellow dyes. These values, when compared with the dye densities prior to the xenon arc illumination, show a 30 percent density loss for the blue dye and a 44 percent density loss for the yellow dye. The foregoing preparation, coating and exposure sequence is repeated three times, employing the same formulation except that 4-isopropyl-2,2-dimethyl-7-tert-butyl-6-chromanol (A) and/or 2,2'-methylenebis[6 - (1 - methylcyclohexyl)-4-methylphenol] (B) are added as stabilizers. The results of the four series are summarized in tabular form as follows:

|  | Hindered phenol (parts by weight) | | Density loss (percent) | |
| --- | --- | --- | --- | --- |
|  | A | B | Blue | Yellow |
| Series: |  |  |  |  |
| 1 | 0 | 0 | 30 | 44 |
| 2 | 10.3 | 0 | 16 | 39 |
| 3 | 0 | 15.6 | 23 | 31 |
| 4 | 5.15 | 7.8 | 18 | 28 |

EXAMPLE II

In a manner similar to Example I, except that 2,2-dimethyl-4-isopropyl - 7 - tert - octyl - 6 - chromanol is employed as the stabilizer, there is obtained as azo dye image having a reduced tendency to fade. Without stabilization, blue fading of 54 percent and yellow fading of 39 percent result. With stabilization, blue fading is only 30 percent and yellow fading is only 24 percent.

EXAMPLE III

In a manner similar to Example I, except that 2,2-dimethyl - 4 - isopropyl - 7 - tetradecyl - 6 - chromanol is employed as the stabilizer, there is obtained an azo dye image having a reduced tendency to fade. Without stabilization, blue fading of 54 percent and yellow fading of 39 percent result. With stabilization, blue fading is only 46 percent and yellow fading is only 25 percent.

EXAMPLE IV

In a manner similar to Example I, except that 2-tert-butyl - 4 - (α-carboethoxytridecyloxy)phenol is employed as the stabilizer, there is obtained an azo dye image having a reduced tendency to fade. Without stabilization, blue fading of 55 percent and yellow fading of 41 percent result. With stabilization, blue fading is only 45 percent and yellow fading is only 34 percent.

EXAMPLE V

In a manner similar to Example I, except that 2-tert-butyl - 4 - dodecyloxyphenol is employed as the stabilizer, there is obtained an azo dye image having a reduced tendency to fade. Without stabilization, blue fading of 45 percent and yellow fading of 35 percent result. With stabilization, blue fading is only 35 percent and yellow fading is only 26 percent.

EXAMPLE VI

In a manner similar to Example I, except that 2,5-di-tert-butylhydroquinone is employed as the stabilizer, there is obtained an azo dye image having a reduced tendency to fade. Without stabilization, blue fading of 46 percent and yellow fading of 41 percent result. With stabilization, blue fading is only 41 percent and yellow fading is only 24 percent.

EXAMPLE VII

In a manner similar to Example I, except that 2,5-di-tert-octylhydroquinone is employed as the stabilizer, there is obtained an azo dye image having a reduced tendency to fade. Without stabilization, blue fading of 45 percent and yellow fading of 35 percent result. With stabilization, blue fading is only 38 percent and yellow fading is only 28 percent.

EXAMPLE VIII

In a manner similar to Example I, except that 2,5-bis(1,1-dimethylpropyl)hydroquinone is employed as the stabilizer, there is obtained an azo dye image having a reduced tendency to fade. Without stabilization, blue fading of 46 percent and yellow fading of 41 percent result. With stabilization, blue fading is only 39 percent and yellow fading is only 23 percent.

EXAMPLE IX

In a manner similar to Example I, except that 7-isopropyl-2,2,4-trimethyl - 6 - chromanol is employed as the stabilizer, there is obtained an azo dye image having a reduced tendency to fade. Without stabilization, blue fading of 54 percent and yellow fading of 39 percent result. With stabilization, blue fading is only 36 percent and yellow fading is only 31 percent.

EXAMPLE X

In a manner similar to Example I, except that 7-tert-butyl - 2,2 - dimethyl - 6 - chromanol is employed as the stabilizer, there is obtained an azo dye image having a reduced tendency to fade. Without stabilization, blue fading of 39 percent and yellow fading of 28 percent result. With stabilization, blue fading is only 22 percent and yellow fading is only 16 percent.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A diazotype composition useful as a reproduction medium, said composition comprising a polymeric matrix having dispersed therein at least one light-sensitive benzene diazonium salt, at least one coupler which can react with said diazonium salt to form an azo dye and a hindered phenol in an amount sufficient to inhibit fading of said azo dye, said hindered phenol having a formula selected from the group consisting of:

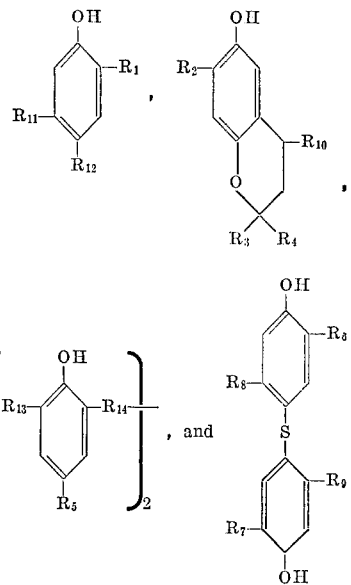

wherein:
$R_1$ is a tertiary alkyl radical having 4–8 carbon atoms; $R_2$ is a straight chain alkyl radical having 9–18 carbon atoms or a branched chain alkyl radical having 1–18 carbon atoms; $R_3$, $R_4$, and $R_5$ are each a lower alkyl radical; $R_6$ and $R_7$ are each a tertiary alkyl radical having 4–8 carbon atoms; $R_8$ and $R_9$ are each an alkyl radical; $R_{10}$ is a hydrogen atom or a lower alkyl radical; $R_{11}$ is a hydrogen atom when $R_{12}$ is an alkyl radical; $R_{11}$ is a tertiary alkyl radical having 4–8 carbon atoms when $R_{12}$ is a hydroxyl radical; $R_{11}$ is a hydrogen atom or a tertiary alkyl radical having 4–8 carbon atoms when $R_{12}$ is an alkoxy radical; $R_{13}$ is a tertiary alkyl radical having 4–8 carbon atoms or a cycloalkyl radical having 4–6 nuclear carbon atoms; $R_{14}$ is a lower alkylene radical.

2. A diazotype composition as described in claim 1, wherein the hindered phenol is selected from the group consisting of:

(a) 2-tert-butyl-4-(α-ethoxycarbonyltridecyloxy) phenol,
(b) 2-tert-butyl-4-dodecoxyphenol,
(c) 2-tert-butyl-4-methoxy phenol,
(d) 2-tert-butyl-4-(carboxymethoxy)phenol,
(e) 2-tert-octyl-4-methoxy phenol,
(f) 2,5-di-tert-butyl-4-methoxy phenol,
(g) 2-tert-butyl-4-methyl phenol,
(h) 2-tert-octyl-4-methyl phenol,
(i) 2,5-di-tert-butylhydroquinone,
(j) 2,5-di-tert-octylhydroquinone,
(k) 2,2-dimethyl-4-isopropyl-7-tert-butyl-6-chromanol,
(l) 2,2-dimethyl-4-isopropyl-7-tert-octyl-6-chromanol,
(m) 2,2-dimethyl-4-isopropyl-7-tetradecyl-6-chromanol,
(n) 2,2,4-trimethyl-7-isopropyl-6-chromanol,
(o) 2,2-dimethyl-7-tert-butyl-6-chromanol,
(p) 2,2'-methylenebis[6-(1-methylcyclohexyl)-4-methylphenol],
(q) 2,2'-methylenebis(6-tert-butyl-4-methylphenol),
(r) 2,2'-methylenebis(6-tert-butyl-4-ethylphenol),
(s) 2,2'-methylenebis(4,6-di-tert-butylphenol), and
(t) 4,4'-thiobis2-tert-butyl-5-methylphenol).

3. A diazotype composition as described in claim 1 and further including couplers to form a blue azo dye and a yellow azo dye, wherein the benzene diazonium salt has the formula:

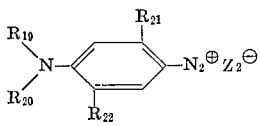

wherein:
(a) each of $R_{19}$ and $R_{20}$, when taken alone, is a lower alkyl radical,
(b) $R_{19}$ and $R_{20}$, when taken together, represent the atoms necessary to complete a morpholino radical,
(c) each of $R_{21}$ and $R_{22}$ is selected from the group consisting of a hydrogen atom, a lower alkyl radical, and a lower alkoxy radical,
(d) $Z_2$ is an anion selected from the group consisting of a chlorozincate anion, a fluoborate anion and a chlorostannate anion;

the blue coupler has the formula:

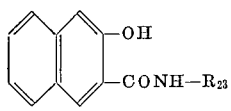

wherein $R_{23}$ is a phenyl radical; and the yellow coupler has the formula:

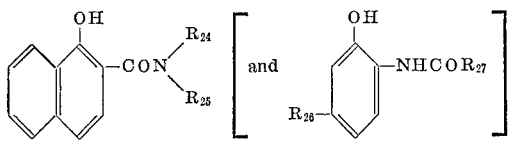

wherein:
(a) each of $R_{24}$ and $R_{25}$, when taken alone, is selected from the group consisting of a hydrogen atom, an alkyl radical, a cycloalkyl radical, an aryl radical and an aralkyl radical,
(b) $R_{24}$ and $R_{25}$, when taken together, are the atoms necessary to complete a six-membered hetero radical selected from the group consisting of a piperidino radical and a morpholino radical.

4. A photographic element comprising a support having coated thereon a light-sensitive diazotype composition as described in claim 3.

5. A photographic element comprising a poly(ethyleneterephthalate) support having coated thereon a light-sensitive diazotype composition comprising, as a diazonium salt, 4-(diethylamino) benzene diazonium chlorozincate; as a blue coupler, 3-hydroxy-N-(2,4-dimethoxy-5-chlorophenyl)-2-naphthamide; and as a yellow coupler, 1-hydroxy-2-naphthoyl piperidide, which couplers can react with said diazonium salt to form an azo dye, and a hindered phenol in an amount sufficient to inhibit fading of said azo dye; said hindered phenol having a formula selected from the group consisting of:

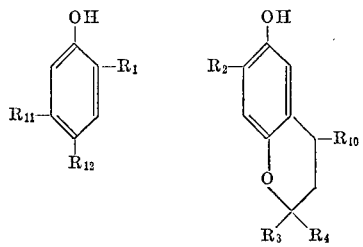

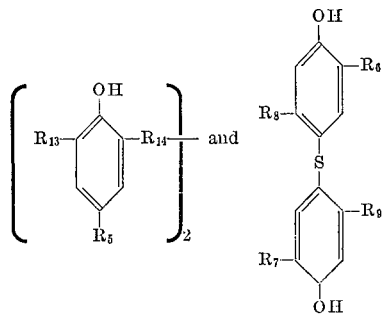

wherein:
$R_1$ is a tertiary alkyl radical having 4–8 carbon atoms; $R_2$ is a straight chain alkyl radical having 9–18 carbon atoms or a branched chain alkyl radical having 1–18 carbon atoms; $R_3$, $R_4$, and $R_5$ are each a lower alkyl radical; $R_6$ and $R_7$ are each a tertiary alkyl radical having 4–8 carbon atoms; $R_8$ and $R_9$ are each an alkyl radical; $R_{10}$ is a hydrogen atom or a lower alkyl radical; $R_{11}$ is a hydrogen atom when $R_{12}$ is an alkyl radical; $R_{11}$ is a tertiary alkyl radical having 4–8 carbon atoms when $R_{12}$ is a hydroxyl radical; $R_{11}$ is a hydrogen atom or a tertiary alkyl radical having 4–8 carbon atoms when $R_{12}$ is an alkoxy radical; $R_{13}$ is a tertiary alkyl radical having 4–8 carbon atoms or a cycloalkyl radical having 4–6 nuclear carbon atoms; $R_{14}$ is a lower alkylene radical.

References Cited

UNITED STATES PATENTS

| | | | |
|---|---|---|---|
| 2,717,832 | 9/1955 | Sulich | 96—91 |
| 2,835,579 | 5/1958 | Thirtle et al. | 96—100X |
| 2,946,684 | 7/1960 | Sus et al. | 96—91 |
| 3,052,542 | 9/1962 | Sulich | 96—91X |
| 3,069,268 | 12/1962 | Herrick | 96—75X |
| 3,113,025 | 12/1963 | Bialczak | 96—49X |
| 3,169,864 | 2/1965 | Holmer | 96—91X |
| 3,183,093 | 5/1965 | Schlesinger et al. | 96—91 |
| 3,248,220 | 4/1966 | Van Rhijn | 96—91 |
| 3,373,021 | 3/1968 | Adams et al. | 96—75X |

FOREIGN PATENTS

| | | | |
|---|---|---|---|
| 937,510 | 9/1963 | Great Britain | 96—91 |
| 980,376 | 1/1965 | Great Britain | 96—91 |

OTHER REFERENCES

Kosar, J., "Light-Sensitive Systems," 1965, p. 223.
Dinabaug, M., "Photosensitive Diazo Cpds.," 1964, pp. 50–53.

NORMAN G. TORCHIN, Primary Examiner

C. L. BOWERS, JR., Assistant Examiner

U.S. Cl. X.R.

96—91, 99, 100, 56.1, 49